(12) United States Patent
Inoue et al.

(10) Patent No.: US 6,443,500 B1
(45) Date of Patent: Sep. 3, 2002

(54) PIPE JOINT

(75) Inventors: Hiroshi Inoue, Kawachinagano (JP); Akio Yasuda, Kawachinagano (JP); Takao Shibata, Kawachinagano (JP)

(73) Assignees: Higashio Mech Co., LTD, Osaka (JP); Inoue Sudare Co., LTD, Osaka (JP)

( * ) Notice: Subject to any disclaimer, the term of this patent is extended or adjusted under 35 U.S.C. 154(b) by 15 days.

(21) Appl. No.: 09/662,313

(22) Filed: Sep. 14, 2000

(30) Foreign Application Priority Data

Feb. 7, 2000 (JP) .......................................... 2000-028725
Jul. 11, 2000 (JP) .......................................... 2000-210389

(51) Int. Cl.[7] .............................................. F16L 37/00
(52) U.S. Cl. .......................... 285/307; 285/93; 285/23; 285/256
(58) Field of Search .......................... 285/93, 23, 256, 285/3, 307

(56) References Cited

U.S. PATENT DOCUMENTS

| 3,885,819 | A | * | 5/1975 | Egerer et al. | 285/93 |
| 4,278,279 | A | * | 7/1981 | Zimmerman | 285/23 |
| 5,102,170 | A | * | 4/1992 | Inoue | 285/307 |
| 6,231,084 | B1 | * | 5/2001 | Hester et al. | 285/23 |

FOREIGN PATENT DOCUMENTS

| JP | 405231571 A | * | 9/1993 | 285/23 |

* cited by examiner

*Primary Examiner*—Lynne H. Browne
*Assistant Examiner*—Aaron Dunwoody
(74) *Attorney, Agent, or Firm*—Armstrong. Westerman & Hattori, LLP

(57) ABSTRACT

A pipe joint provided with a pipe joint main body having an insertion cylinder portion inserted to an end portion of a pipe to be connected, a seal member attached to a peripheral groove on the insertion cylinder portion, a clamp ring with a slit for fastening the end portion of the pipe outserted to the insertion cylinder portion with elastic fastening force, and a diameter-extension piece detachably held at the slit as to extend the clamp ring resisting the elastic force of the clamp ring and detached by contact with a forth end of the pipe.

8 Claims, 20 Drawing Sheets

Fig. 27A
Fig. 27B
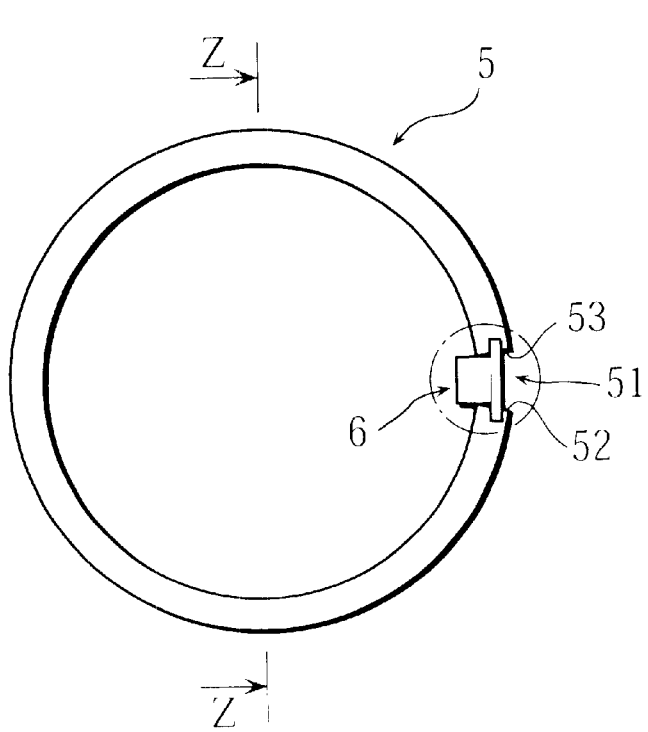
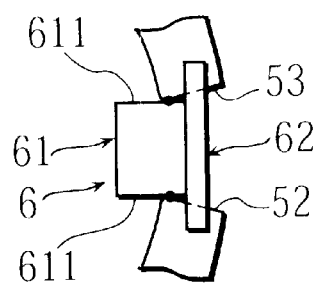
Fig. 28
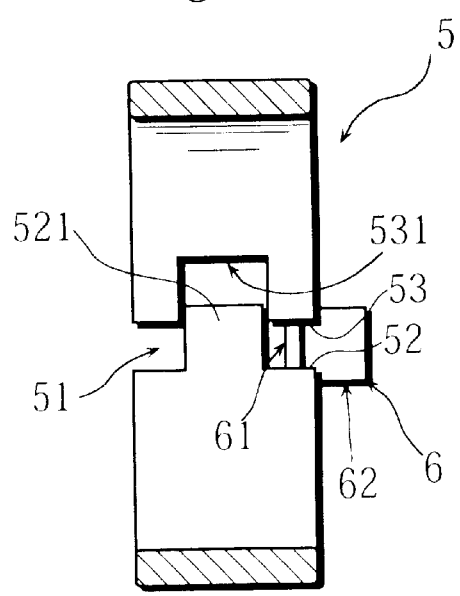

US 6,443,500 B1

PIPE JOINT

BACKGROUND OF THE INVENTION

1. Field of the Invention

This invention relates to a pipe joint.

2. Description of the Related Art

Conventionally, as a pipe joint for connecting cold-water supplying pipes or hot-water supplying pipes made of synthetic resin, for example, a pipe joint shown in FIG. 30, composed of a joint main body c having an insertion cylinder portion b on which a plural-staged peripheral taper is formed for stopping a pipe a, a split ring e having a split d, and a cap nut f to contract the split ring e.

In this pipe joint, firstly, the cap nut f and the split ring e are fit to the pipe a and the pipe a is outserted to the insertion cylinder portion b of the joint main body c. Then, the split ring e is contracted by screwing the cap nut f to a screw portion g of the joint main body c to stop the pipe a onto the insertion cylinder portion b of the joint main body c.

However, the conventional pipe joint is composed of three parts, parts control becomes difficult thereby. Especially, in case that many pipe joints are necessary, it is considerably difficult to prepare these parts on a working site without lack and excess. And, there is also a problem that the parts are frequently lost. Further, assemble work of the joint is inefficient for three assembly processes.

And, in case that diameter of the pipe a varies or dimensional change is caused by heat deformation, etc., sufficient leakage prevention may not be kept because sealing ability is obtained by tightening the pipe a on its peripheral face. Especially, under the circumstances of great temperature change, excellent leakage prevention may not be kept durable and stable.

It is therefore an object of the present invention to provide a pipe joint with which workability is good, control and supply of the parts are easy, the parts are hardly lost, and durable and stable leakage prevention can be kept.

BRIEF DESCRIPTION OF THE DRAWINGS

The present invention will be described with reference to the accompanying drawings, in which:

FIG. 27A is a side view of a clamp ring to which a diameter-extension piece is press-fitted;

FIG. 27B is a partial enlarged side view of the clamp ring to which the diameter-extension piece is press-fitted;

FIG. 28 is a cross-sectional view at Z—Z line in FIG. 27A;

DESCRIPTION OF THE PREFERRED EMBODIMENTS

Preferred embodiments of the present invention will now be described with reference to the accompanying drawings.

Figure 1:
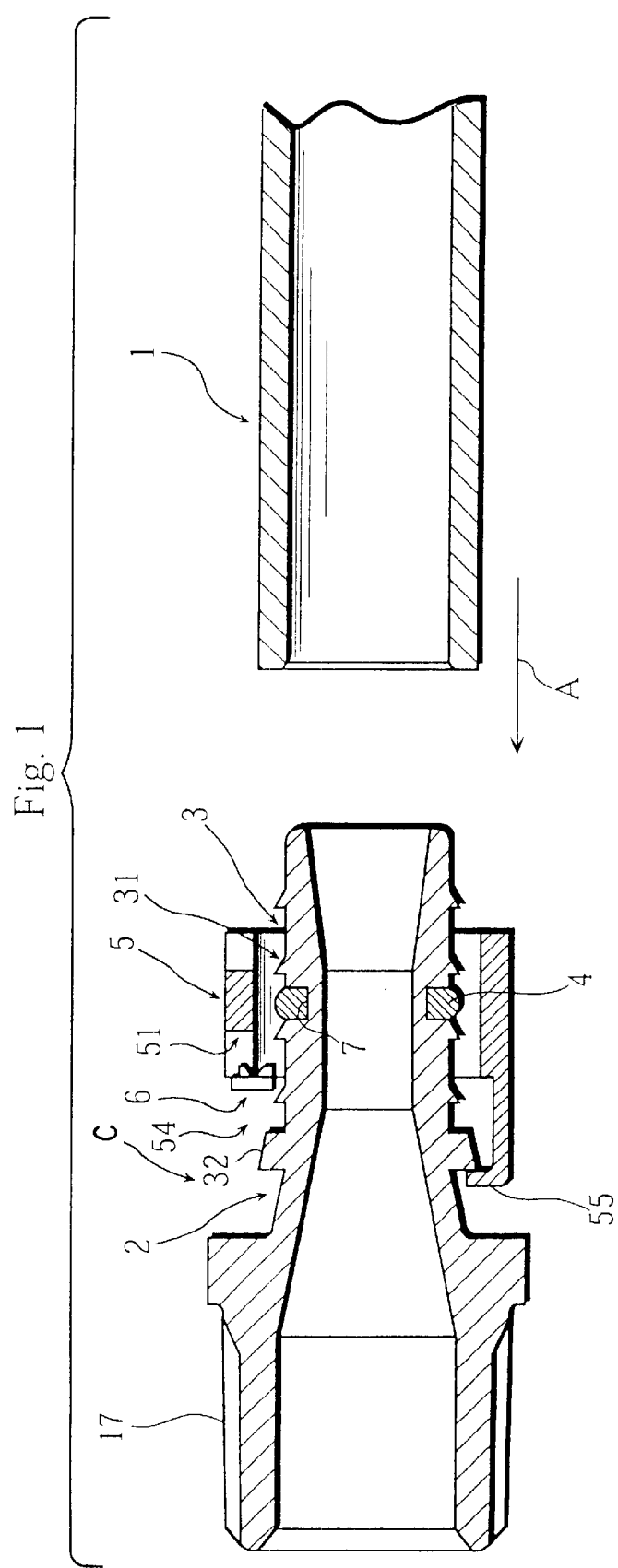
FIG. 1 is a cross-sectional view showing a preferred embodiment of a pipe joint of the present invention.
Figure 2:
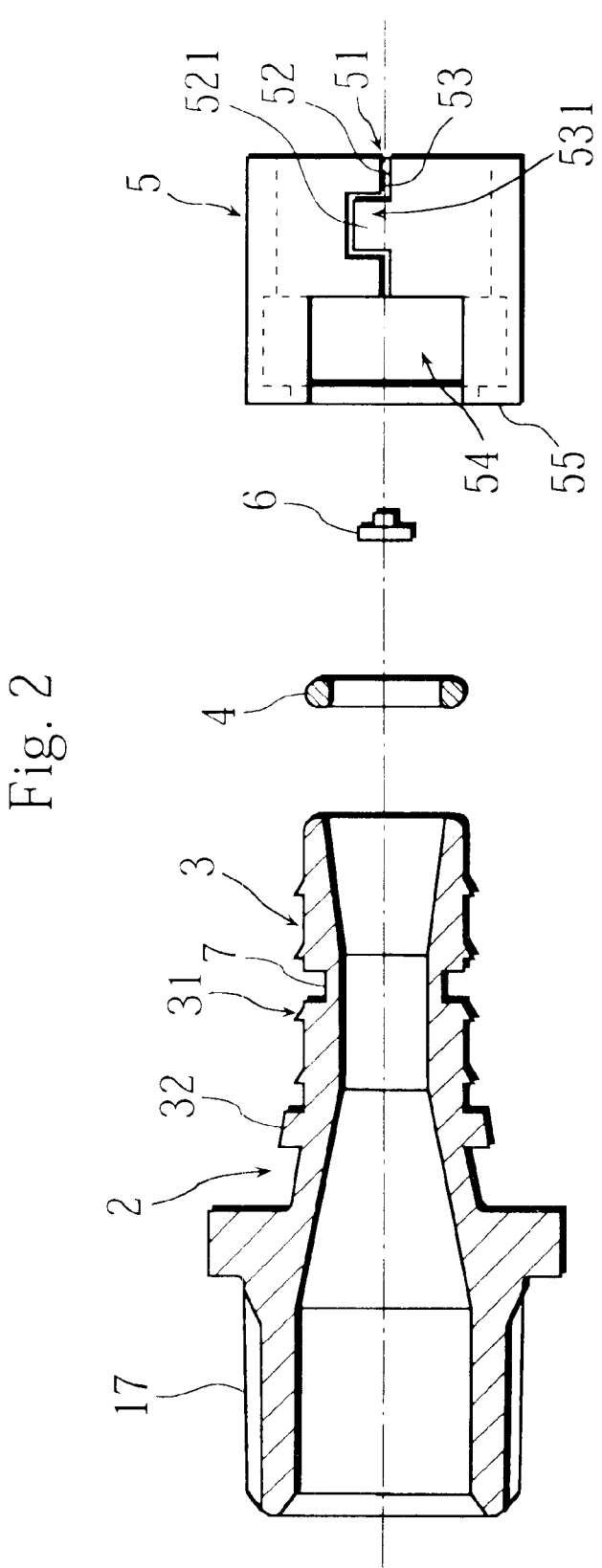
FIG. 2 is an exploded view of the pipe joint.
Figure 3:
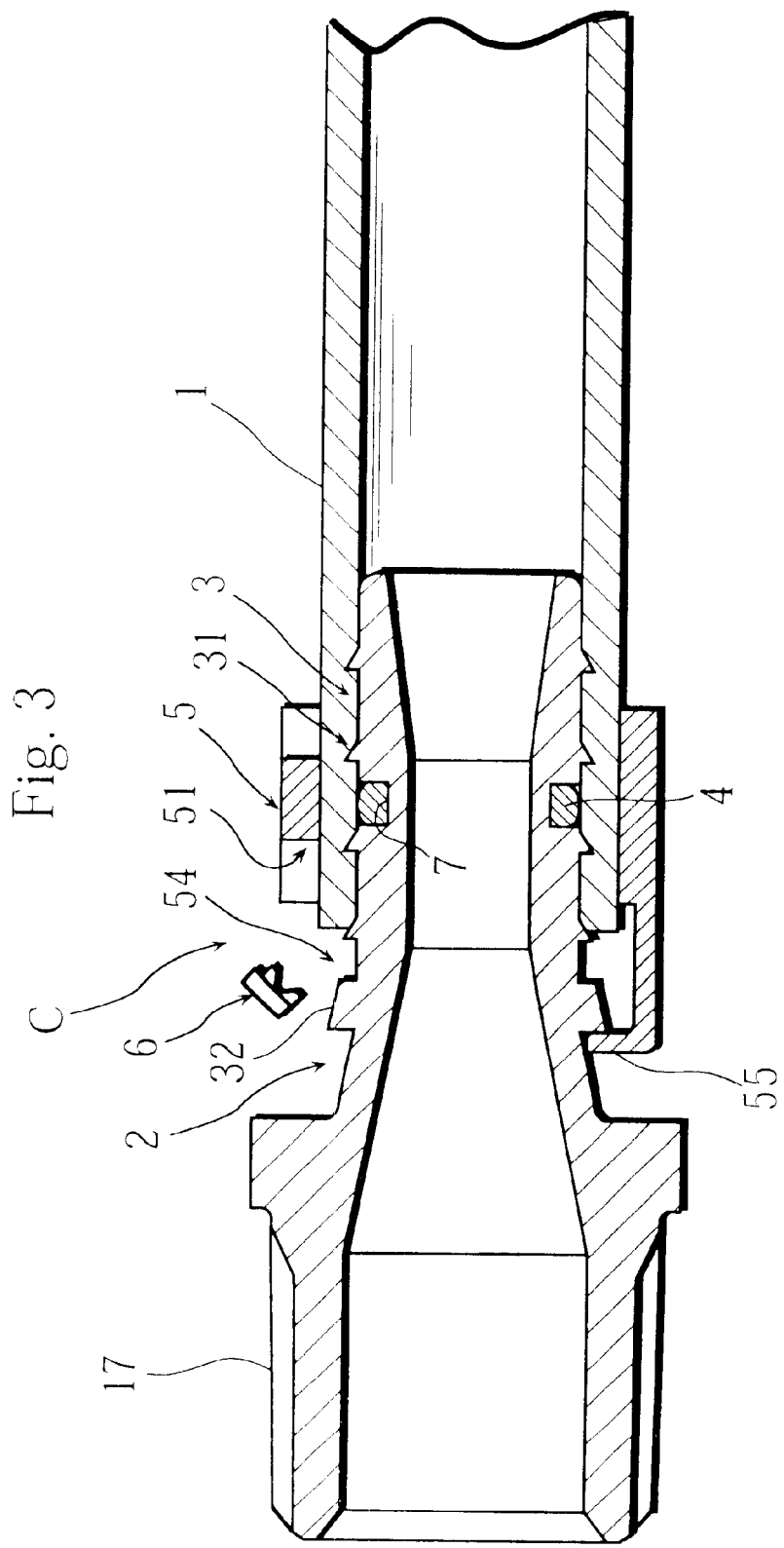
FIG. 3 is a cross-sectional view of a state in which a pipe is inserted to the pipe joint.

FIG. 1 is a cross-sectional view showing a preferred embodiment of a pipe joint C, FIG. 2 is an exploded view, and FIG. 3 is a cross-sectional view of a state in which a pipe is connected. In these Figures, mark 1 indicates a water-supplying pipe to be connected composed of, for example, synthetic resin such as crosslinked-polyethylene, polybutene, etc. Mark 2 indicates a joint main body having an insertion cylinder portion 3 to be inserted to an end portion of the pipe 1 on one end side. A hitching stop portion 31, having a plural-staged peripheral taper for hitching the pipe 1 to stop, is formed on periphery of the insertion cylinder portion 3. And, a male screw 17 screwing to a connected member (not shown in Figures) is formed on another end side (end portion) of the joint main body.

Mark 4 indicates an O-ring (sealing member) attached to a peripheral concave groove 7 on the insertion cylinder portion 3 of the joint main body 2. Mark 5 indicates a clamp ring composed of spring steel having a split (slit) 51 in an axis direction for fastening the end portion of the pipe 1 outserted to the insertion cylinder 3 with elastic fastening force. Mark 6 indicates a diameter-extension piece composed of steel of high rigidity which is detachably press-fitted to the slit 51 resisting the elastic force of the clamp ring 5 to extend the clamp ring 5 as the pipe 1 can be inserted to the clamp ring 5 in an initial state shown in FIG. 1.

Figure 4A:
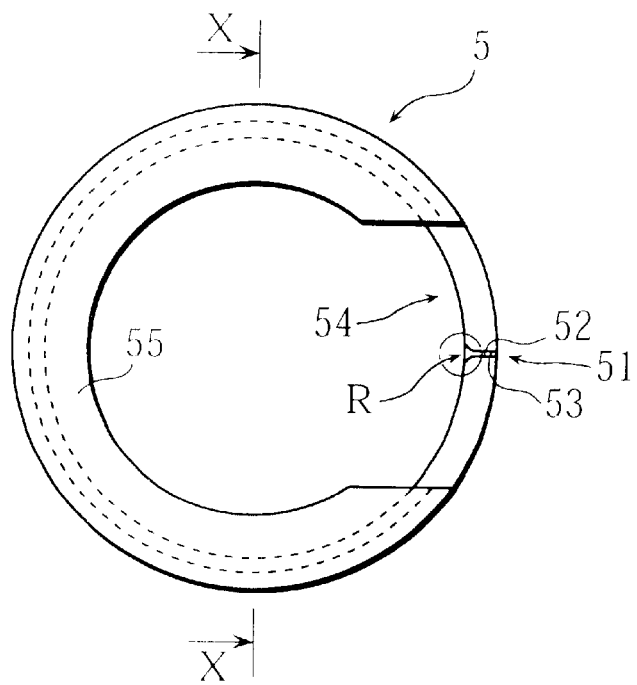
FIG. 4A is a side view of a clamp ring.
Figure 4B:
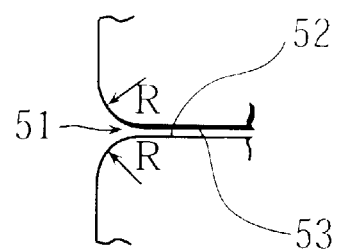
FIG. 4B is a partial enlarged side view of the clamp ring.
Figure 5:
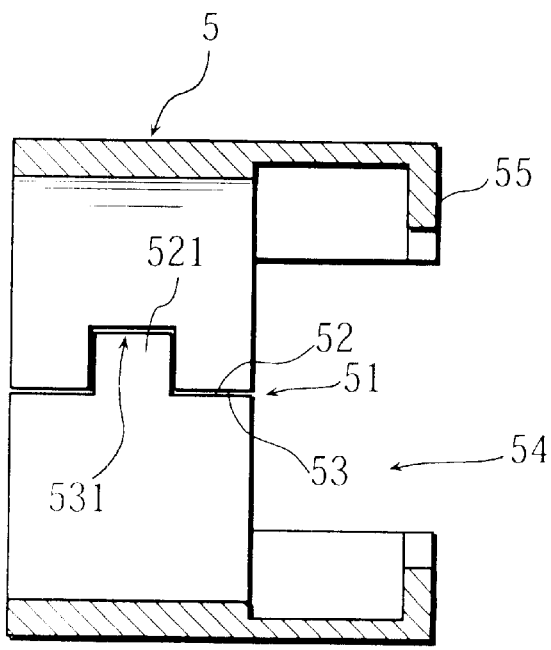
FIG. 5 is a cross-sectional view at X—X line in FIG. 4A.
Figure 6:
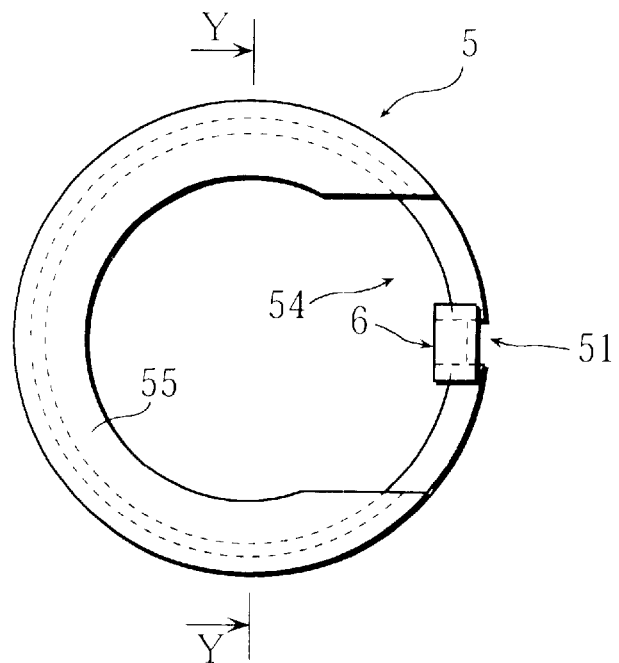
FIG. 6 is a side view of the clamp ring to which a diameter-extension piece is press-fitted.
Figure 7:
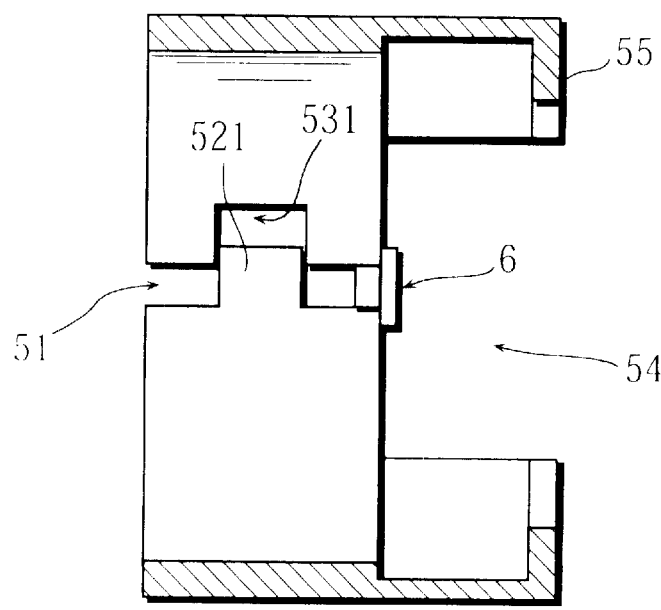
FIG. 7 is a cross-sectional view at Y—Y line in FIG. 6.

As shown in a side view of FIG. 4A, an enlarged view (of a part within an imaginary circle in FIG. 4A) of a principal portion of FIG. 4B, and FIG. 5 showing a free state (contraction state) of the clamp ring 5, and in FIGS. 6 and 7 showing an extended state of the clamp ring 5, the slit 51 is formed by a protruding portion 521 formed on an end face 52 and a concave portion 531 formed on another end face 53 fitting each other. By this shape of the slit 51, fastening force works continuously on the pipe 1 in peripheral direction without interruption, the pipe 1 is pressed to the sealing member 4 as to form a closed-loop without deviation, and sealing ability is improved by prevention of fluid from leaking in the axis direction.

And, inner end edges of the both end faces 52 and 53 facing on the both sides of the slit 51 are formed in R-shaped chamfers. Radius of curvature R of the inner end edge, set corresponding to diameter, wall thickness, material, etc. of the pipe 1, is preferably set to be approximately 0.4 mm to 0.6 mm in a case that outer diameter of the clamp ring 5 in the free state is φ15 mm to 35 mm. Therefore, with the inner end edges of the both end faces 52 and 53 formed in R-shaped chamfers, surface of the pipe 1 is not damaged when the clamp ring 5 contracts, the diameter-extension piece 6 is smoothly detached, and strong fastening force works on the pipe 1.

And, one end side (an inner end side of the slit 51) is notched in rectangle to form a notched portion 54, and detachment of the diameter-extension piece 6 becomes possible thereby (refer to FIG. 3). And, an inward flange 55 is formed on a periphery of the clamp ring 5 except the notched portion 54. The inward flange 55 is hitched to a hitching flange 32 formed on the joint main body 2 to stop the clamp ring 5 extended by the diameter-extension piece 6 (refer to FIG. 1). And, although not shown in Figures, a knurling or tapered hitching stop face for hitching onto the peripheral face of the pipe 1 may be formed on an inner peripheral face of the clamp ring 5.

Figure 8:
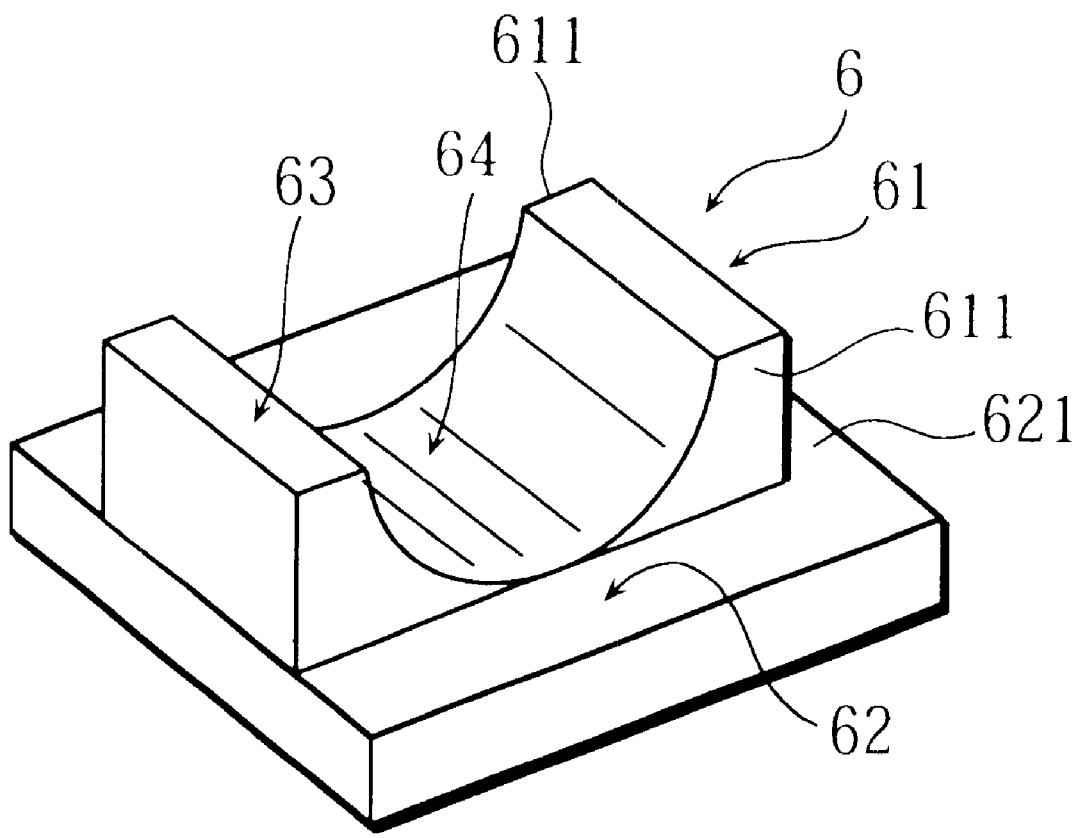
FIG. 8 is a perspective view of the diameter-extension piece.
Figure 9A:
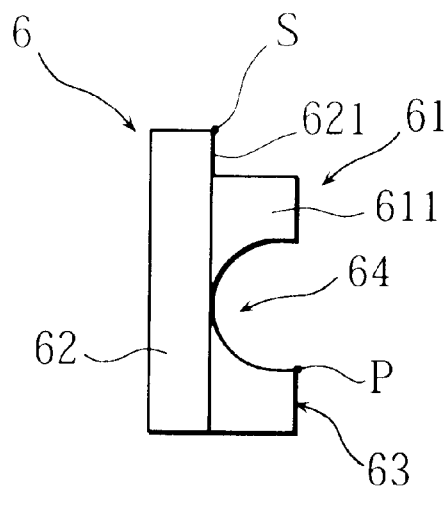
FIG. 9A is a side view of the diameter-extension piece.
Figure 9B:
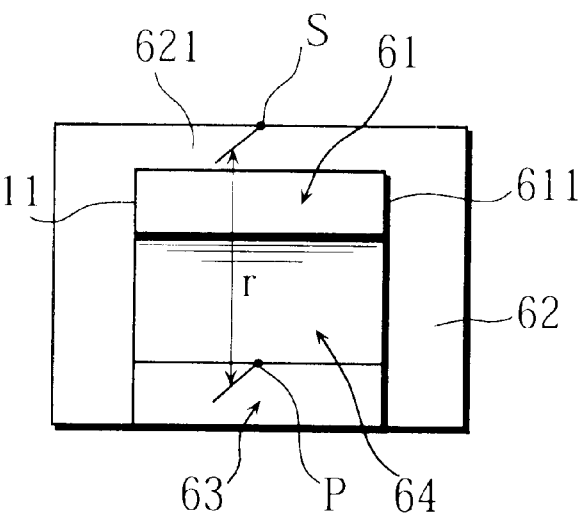
FIG. 9B is a front view of the diameter-extension piece.

As shown in an enlarged perspective view of FIG. 8, a side view of FIG. 9A, and a front view of FIG. 9B, the diameter-extension piece 6 is composed of a press-fit portion 61 press-fitted to the slit 51 and a regulation portion 62 which contacts a side end face of the clamp ring 5 to regulate press-fit position of the diameter-extension piece 6 unitedly formed. And, pressed surfaces 611, held by the slit 51 of the clamp ring 5, are formed on both sides of the press-fit portion 61 on the peripheral side (when press-fitted).

And, a protruding contact portion 63 which contacts the forth end portion of the inserted pipe 1 is formed on the inner peripheral side (when press-fitted) of the diameter-extension piece 6, and a concave portion 64, allowing intrusion of the forth end portion of the pipe 1 when the diameter-extension piece 6 turns as described later, is formed on a central portion of the diameter-extension piece 6. On the other hand, an extended portion 621 is formed by extending the peripheral side (when press-fitted) of the regulation portion 62 slightly outward from the press-fit portion 61.

Figure 11:
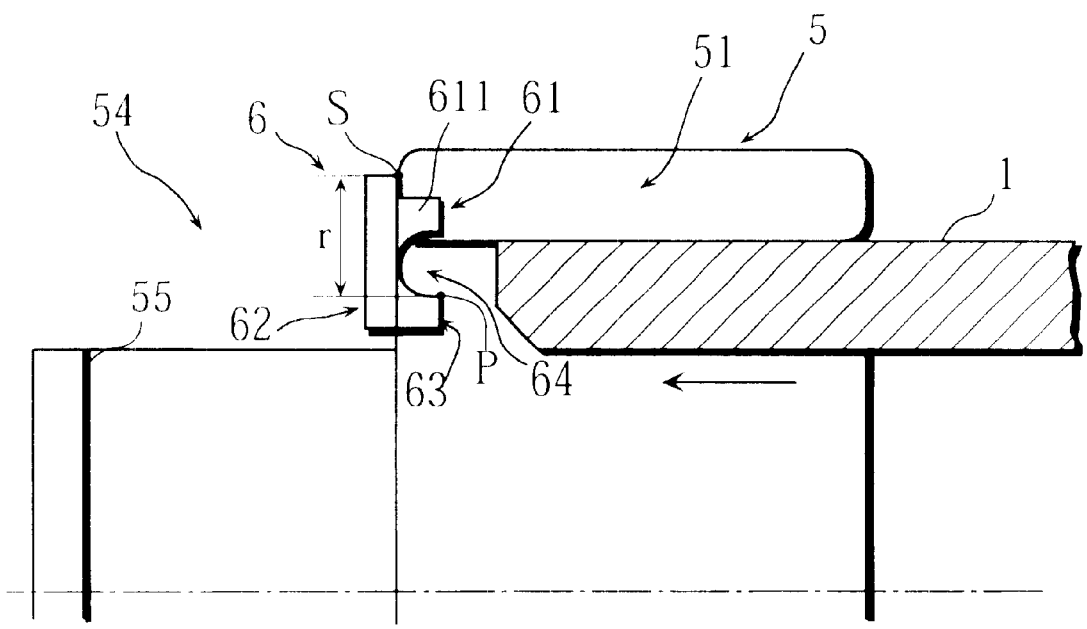
FIG. 11 is an explanatory view showing correspondence of the diameter-extension piece and the pipe.

And, as shown in FIG. 11, in a state that the diameter-extension piece 6 is press-fitted to (held by) the slit 51, a predetermined interval r is set between an end portion S on the peripheral side of the extended portion 621 of the regulation portion 62 and a contact portion P on the protruding contact portion 63 which contacts the forth end portion of the pipe 1 as sufficient angular moment works on the press-fitted diameter-extension piece 6 to facilitate the detachment of the diameter-extension piece 6 from the slit 51. In this case, the end portion S on the peripheral side of the regulation portion 62 is a center of turning of the diameter-extension piece 6 in the detachment (refer to FIG. 12 and FIG. 13).

Figure 12:
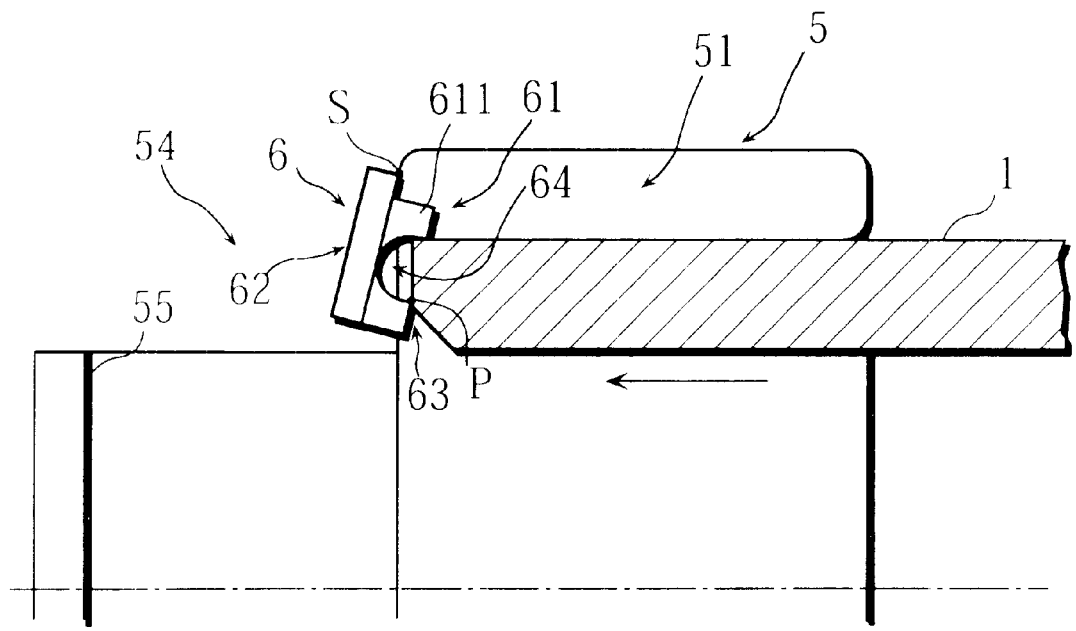
FIG. 12 is an explanatory view when the pipe contacts the diameter-extension piece.
Figure 13:
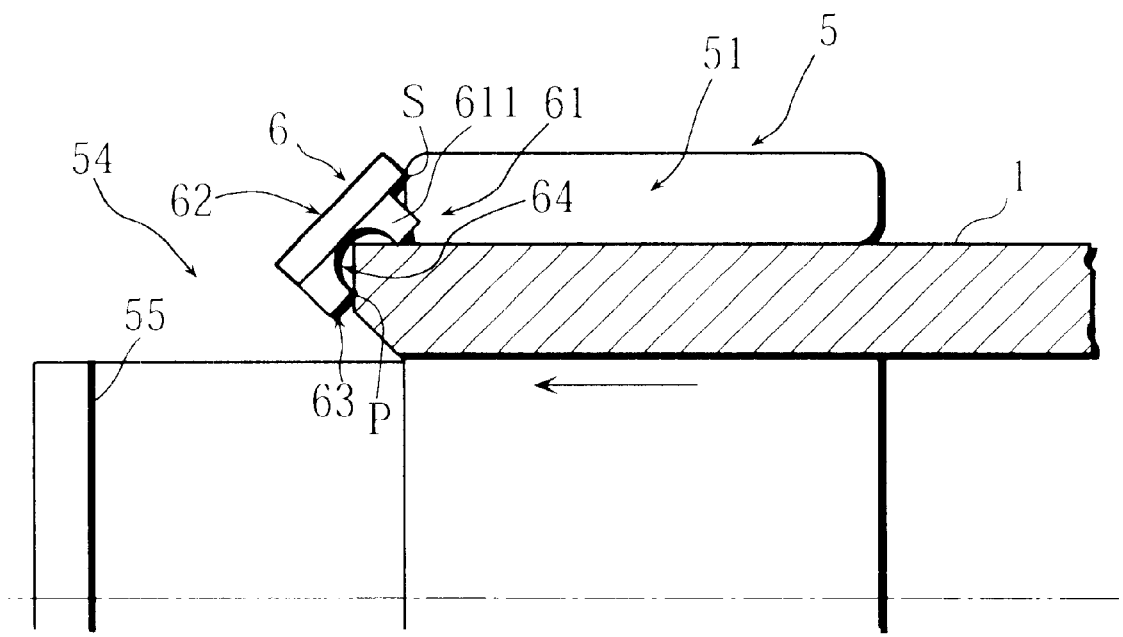
FIG. 13 is an explanatory view when the diameter-extension piece is turned by the pipe.

With the construction as described above, in the pipe joint C in the initial state as shown in FIG. 1, the end portion of the pipe 1 can be pushed into the clamp ring 5 in a direction of an arrow A because the diameter of the clamp ring 5 is extended by the diameter-extension piece 6 as to allow the insertion of the pipe 1. By this pushing movement of the pipe 1, as shown in FIG. 11 through FIG. 13, the forth end portion of the pipe 1 contacts the protruding contact portion 63 of the diameter-extension piece 6 and turns the diameter-extension piece 6 as to certainly detach from the slit 51.

Figure 10A:
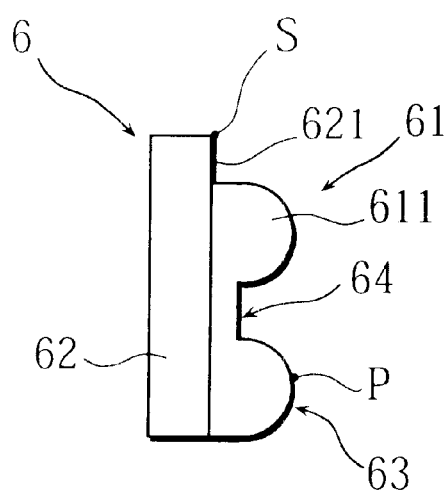
FIG. 10A is a side view showing another example of the diameter-extension piece.
Figure 10B:
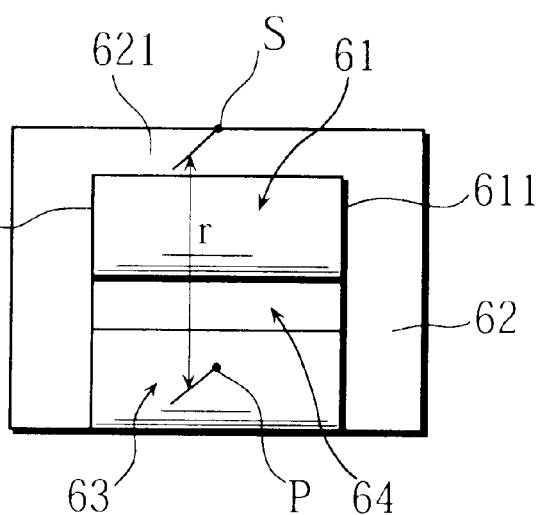
FIG. 10B is a front view showing another example of the diameter-extension piece.

When the diameter-extension piece 6 is turned, the turning of the diameter-extension piece 6 is stabilized because the forth end portion of the pipe 1 intrudes to the concave portion 64 (refer to FIG. 13), and the detachment of the diameter-extension piece 6 is made easy because large angular moment is added to the diameter-extension piece 6 with small pushing force of the pipe 1 by the sufficient interval r set between the end portion S on the peripheral side of the extended portion 621 of the regulation portion 62 and the contact portion P on the protruding contact portion 63 as described above. This detachment of the diameter-extension piece 6 is realized also with another example of the diameter-extension piece 6 shown in FIG. 10A and FIG. 10B. In this case, the protruding contact portion 63 has arc configuration in a side view.

When the diameter-extension piece 6 is detached from the slit 51, detachment sound (click sound) recognizable from the outside is generated, the diameter-extension piece 6 is ejected as shown in FIG. 3, the clamp ring 5 contracts immediately, the pipe 1 is fastened, the inner face of the pipe 1 is tightly sealed by the sealing member (O-ring) 4, and the clamp ring 5 hitches onto the peripheral face of the pipe 1 as to be stopped. As described above, the worker can clearly check the fastening (insertion) of the pipe 1 finished by the detachment sound of the diameter-extension piece 6.

In the connected state as described above, the pipe 1 is stopped onto the joint main body 2 because the pipe 1 is contracted by the clamp ring 5 and bites into the insertion cylinder portion 3, and tightness is kept on the entire inner periphery of the pipe 1 by the sealing member 4 without interruption. Therefore, excellent leakage prevention is always kept and durable and stable sealing ability is secured even with variation of diameter of the pipe 1 and dimensional change caused by thermal deformation.

The connecting work, comprising only pushing the pipe 1 to the joint main body 2, can be completed very efficiently with one movement and without connecting tools, fastening parts, and high skill. And, workability at working sites is remarkably improved because the completion of the connecting work is checked by the detachment sound of the diameter-extension piece 6. And, control of the parts is easy, preparation of the parts at the working sites is easy and certain, and missing of the parts hardly occurs because the parts of the pipe joint are unitedly assembled beforehand.

Figure 14:
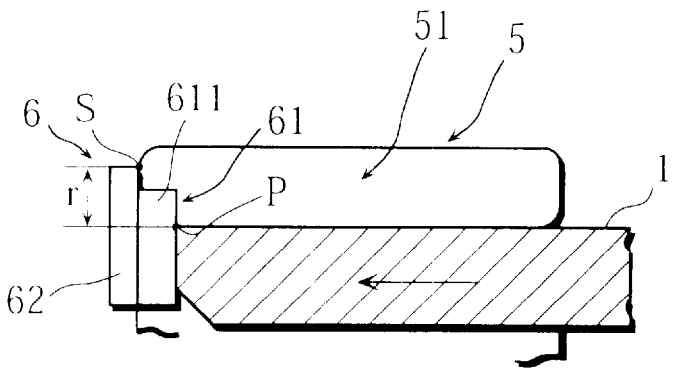
FIG. 14 is an explanatory view when the pipe contacts a different diameter-extension piece.

FIG. 14 shows a different example of the diameter-extension piece 6. In this case, the concave portion receiving the forth end portion of the pipe 1 is not formed on the press-fit portion 61. And, the interval r between the end portion S on the extended portion 621 of the regulation portion 62 and the contact portion P on the pipe 1 is made considerably small. Although the certain detachment of the diameter-extension piece 6 is achieved by insertion of the pipe 1 with this construction, the pushing force of the pipe 1 may be rather stronger than that of the embodiment shown in FIG. 11 through FIG. 13.

Figure 15:
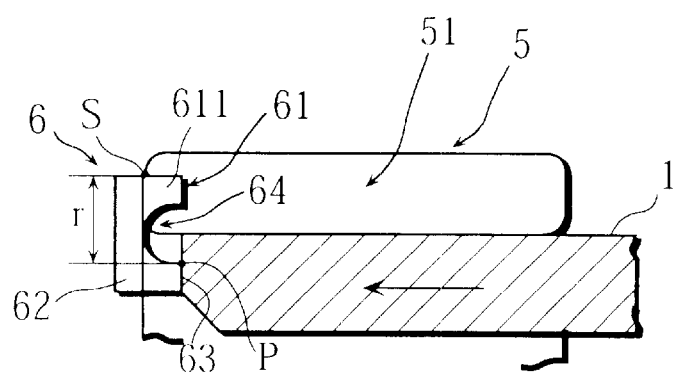
FIG. 15 is an explanatory view when the pipe contacts another diameter-extension piece.
Figure 16:
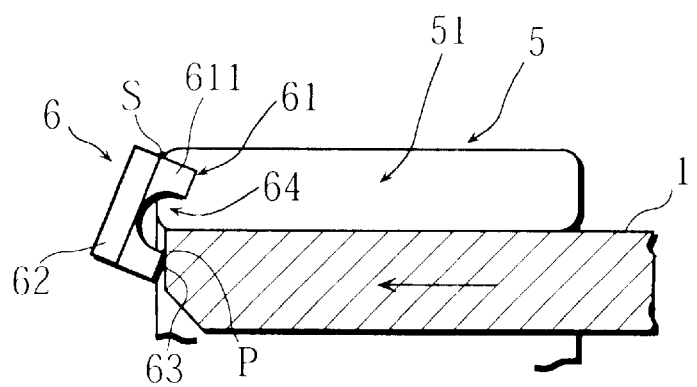
FIG. 16 is an explanatory view when another diameter-extension piece is turned by the pipe.

FIG. 15 and FIG. 16 show another example of the diameter-extension piece 6. In this case, the interval r between the end portion S on the extended portion 621 of the regulation portion 62 and the contact portion P on the pipe 1 is made slightly small because the extended portion 621 is not formed on the regulation portion 62. Although the certain detachment of the diameter-extension piece 6 is achieved by insertion of the pipe 1 with this construction, the pushing force of the pipe 1 may be rather stronger than that of the embodiment shown in FIG. 11 through FIG. 13.

Figure 17:
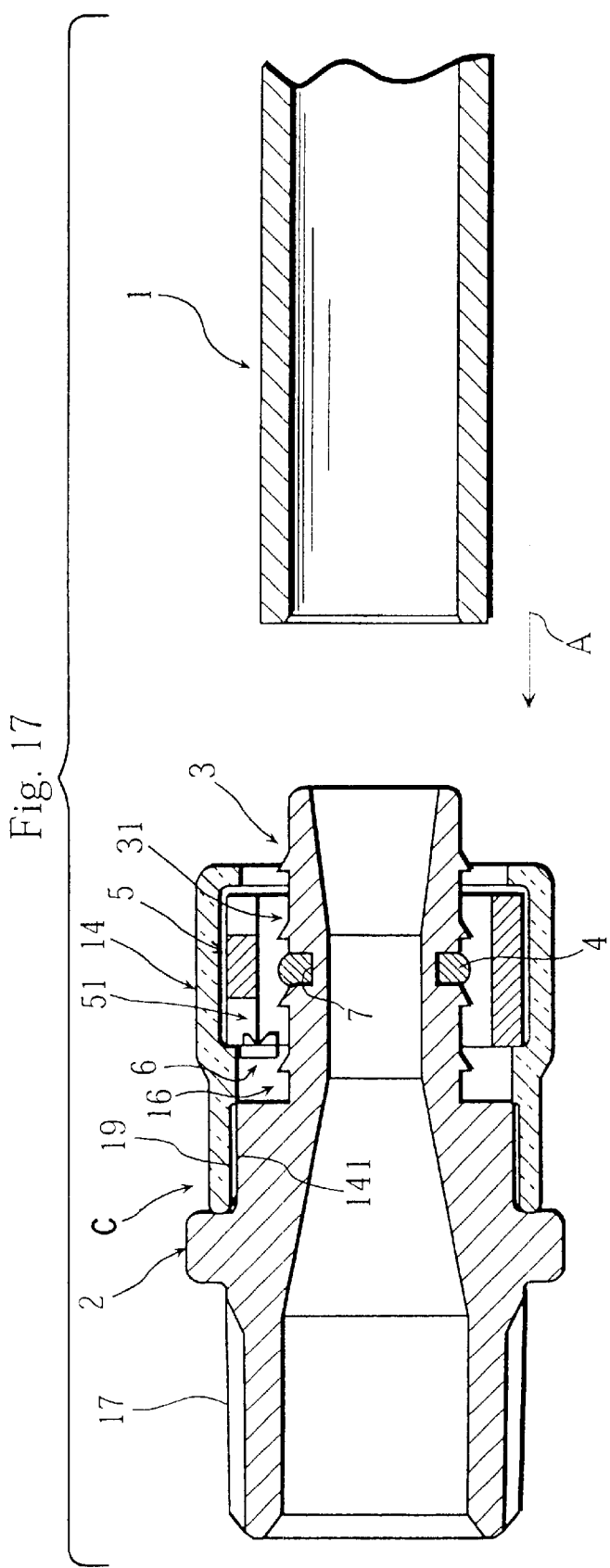
FIG. 17 is a cross-sectional view showing another embodiment of the pipe joint of the present invention.
Figure 18:
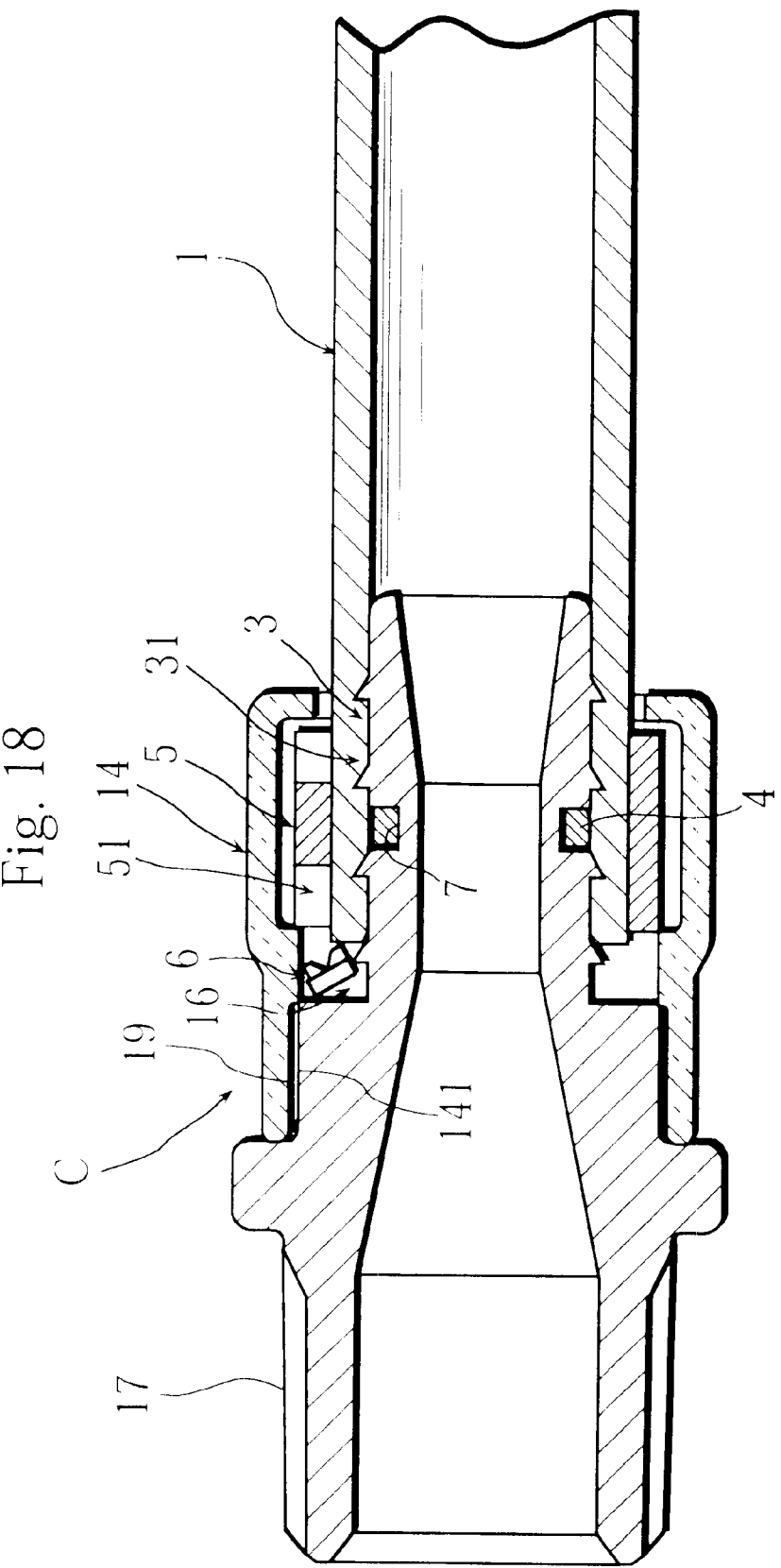
FIG. 18 is a cross-sectional view of a state in which a pipe is inserted to the pipe joint.

FIG. 17 through FIG. 22 show another embodiment of the pipe joint C. In this case, as shown in FIG. 17 showing pre-insertion state of the pipe 1 and FIG. 18 showing inserted state of the pipe 1, a cover 14 covering the clamp ring 5 is provided. A female screw 141 formed on an inner face of a base portion of the cover 14 screws to a male screw 19 formed on an outer face of the insertion cylinder portion 3 of the joint main body 2 near a base portion of the insertion cylinder portion 3, and an escape space 16 of ring for storing the diameter-extension piece 6 detached from the slit 51 of the clamp ring 5 is formed between the cover 14 and the insertion cylinder portion 3.

Figure 19A:
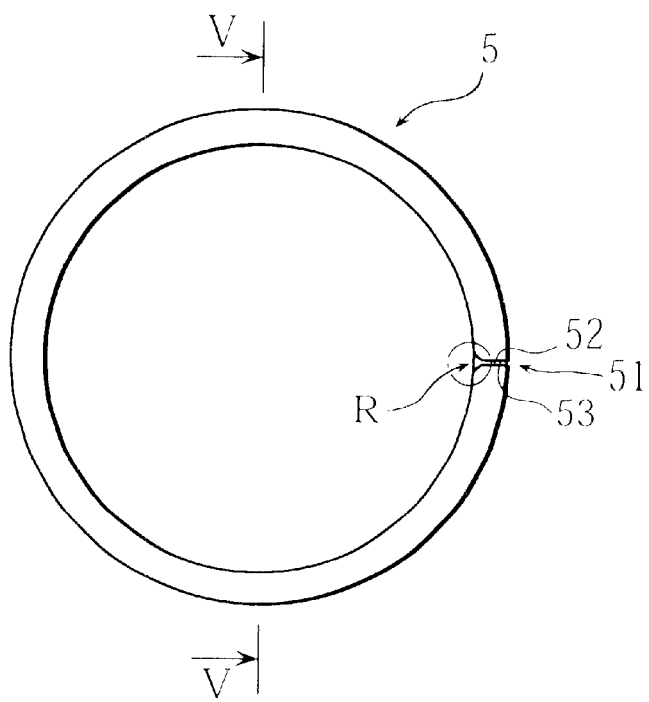
FIG. 19A is a side view of a clamp ring.
Figure 19B:
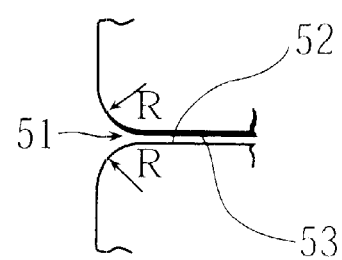
FIG. 19B is a partial enlarged side view of the clamp ring.
Figure 20:
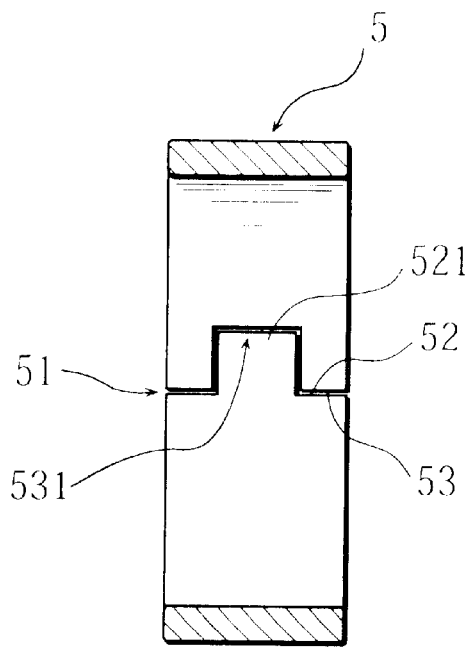
FIG. 20 is a cross-sectional view at V—V line in FIG. 19A.
Figure 21:
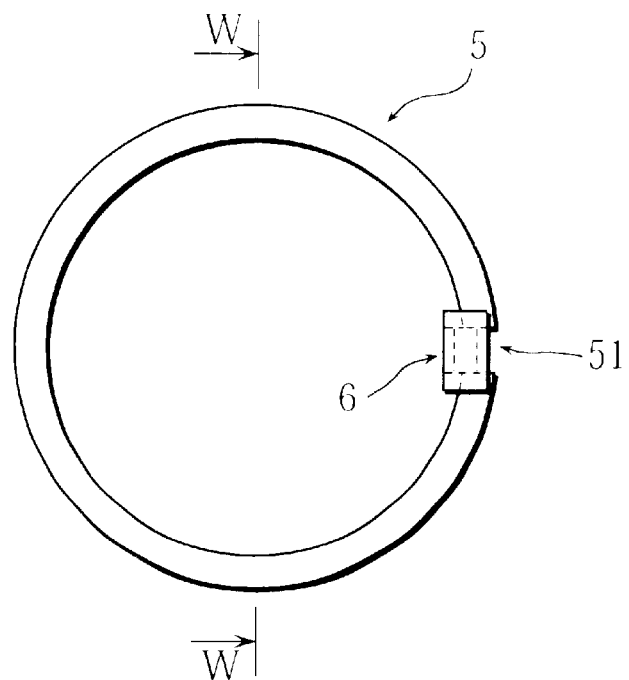
FIG. 21 is a side view of the clamp ring to which a diameter-extension piece is press-fitted.
Figure 22:
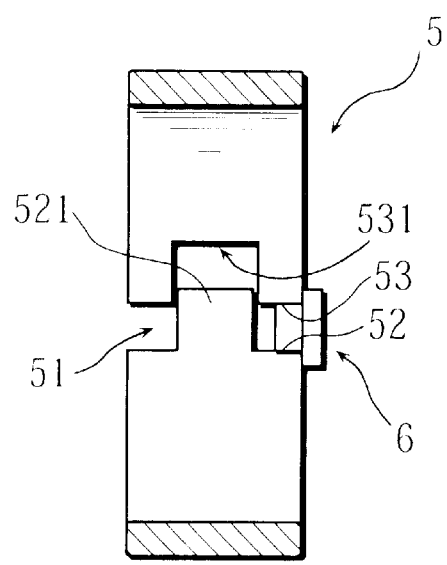
FIG. 22 is a cross-sectional view at W—W line in FIG. 21.

The clamp ring 5, as shown in a side view of FIG. 19A, an enlarged view (of a part within an imaginary circle in FIG. 19A) of a principal portion of FIG. 19B, and FIG. 20 showing a free state of the clamp ring 5 and in FIG. 21 and FIG. 22 showing an extended state of the clamp ring 5, has a very simple construction in which only a concavo-convex slit 51 is provided without forming the notched portion 54 and the inward flange 55 provided to the clamp ring 5 of the former-described embodiment. The construction around the slit 51 in which the inner end edges of the both end faces 52 and 53 facing on the both sides of the slit 51 are formed in R-shaped chamfers, the movement of the diameter-extension piece 6 in detachment, and the generation of the detachment sound are same as that in the former-described embodiment. In this case, there is an advantage that sealability of the joint can be kept stable in a long term because the durability of the joint is improved by the cover 14 which protects the connected portion of the pipe 1. And, the cover 14 is preferably composed of transparent resin such as PA (polyamide, nylon), PES (polyethersulphone), or PC (polycarbonate) to check the detachment of the diameter-extension piece 6 (visually) from the outside.

Next, FIGS. 23 through 29 show still another embodiment of the pipe joint C. As clearly shown by comparison with FIGS. 17 through 22, following constructions are different. That is to say, as shown in an enlarged perspective view of FIG. 25, a side view of FIG. 26A, and a rear view of FIG. 26B, a bent portion 612 is disposed on an end portion of a press-fit portion 61 of a diameter-extension piece 6, and a regulation portion 62 is continuous from the bent portion 612.

To describe concretely, the press-fit portion 61 is formed by bending a side portion of a rectangle flat plate, the regulation portion 62 is a rectangle flat plate wider than the press-fit portion 61 one of which side faces is tapered, and the press-fit portion 61 and the regulation portion 62 are continuous. That is to say, the diameter-extension piece 6 has a configuration of an approximately T-shaped flat plate bent at a middle portion.

And, as shown in a side view of FIG. 27A, an enlarged view (of a part within an imaginary circle in FIG. 27A) of a principal portion of FIG. 27B, and FIG. 28, in a state that the diameter-extension piece 6 is press-fitted to a clamp ring 5 (of which free state is shown in FIG. 19 and FIG. 20), the press-fit portion 61 is held by inner end edges of the clamp ring 5, an end side of the diameter-extension piece 6 is protruded inward in a diameter direction of the clamp ring 5, and the regulation portion 62 is protruded outward in an axis direction of the clamp ring 5.

To describe concretely, middle portions of pressed surfaces 611 of the press-fit portion 61 are held by inner end edges of both end faces 52 and 53 of the clamp ring 5, the press-fit portion 61 is protruded inward in the diameter direction of the clamp ring 5 as to contact a forth end face of an inserted pipe 1, and the regulation portion 62 is protruded outward in the axis direction of the clamp ring 5 as to position the tapered side as a forth end.

Figure 23:
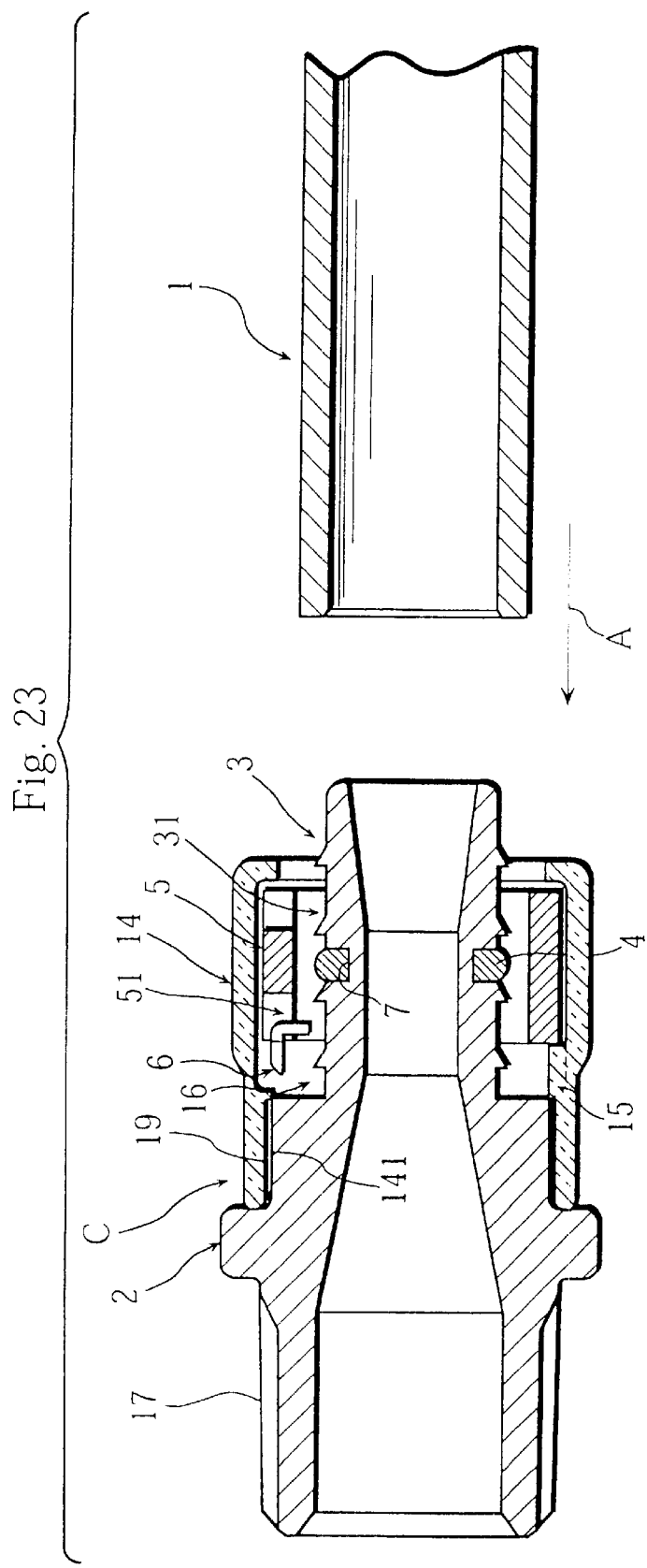
FIG. 23 is a cross-sectional view showing still another embodiment of the pipe joint of the present invention.
Figure 24:
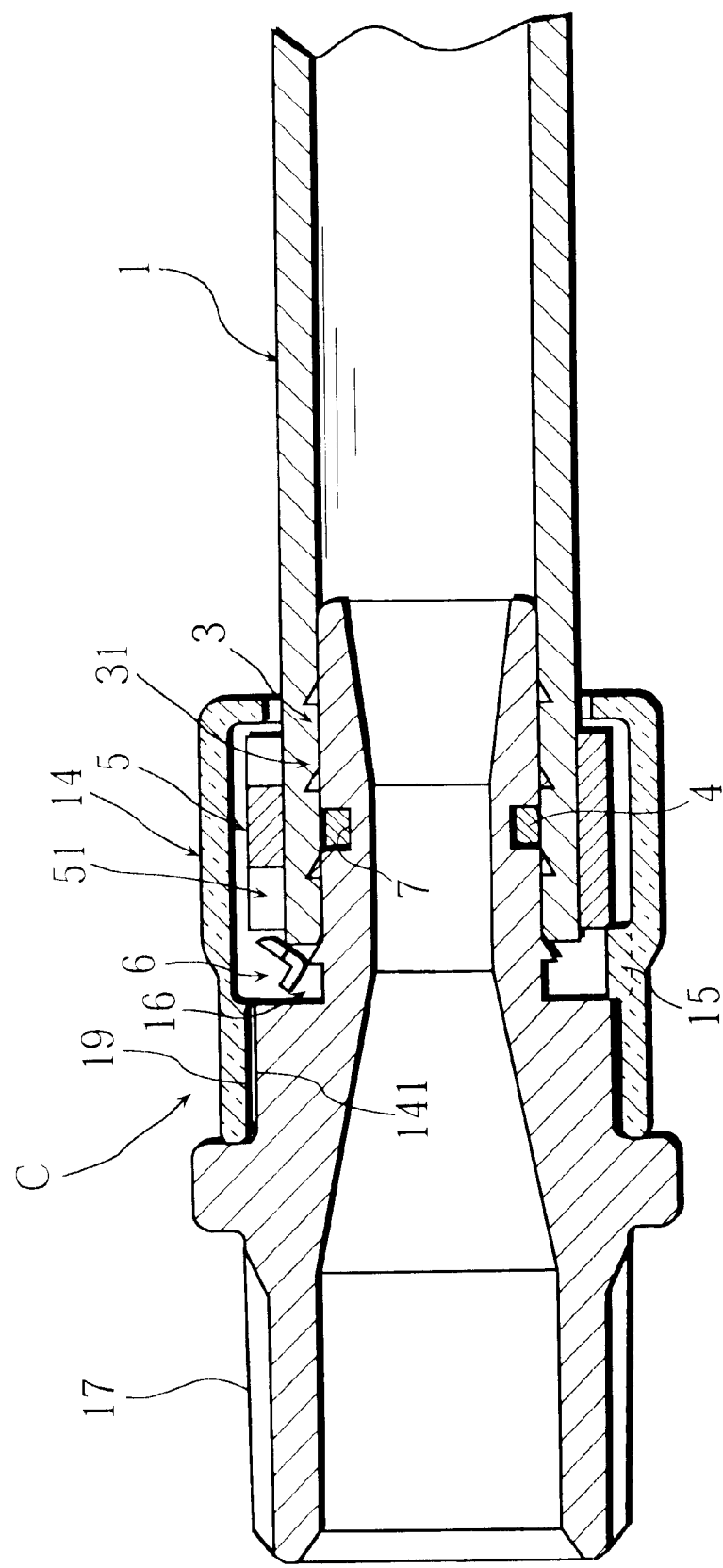
FIG. 24 is a cross-sectional view of a state in which a pipe is inserted to the pipe joint.

And, as shown in FIG. 23, the clamp ring 5 and the diameter-extension piece 6 assembled as described above are fit into a cover 14. Plural (three, for example) contact portions 15 are formed in a peripheral direction on an inner peripheral face of the cover 14 to regulate the clamp ring 5 not to excessively move to inner side in the axis direction of the pipe joint by touching an end face of the clamp ring 5.

In this case, although the clamp ring 5 can move for a minute distance (1 mm, for example) in the axis direction between the contact portions 15 and an opening end of the cover 14, the diameter-extension piece 6 (the regulation portion 62) is prevented from being caught by a gap between the contact portion 15 and the end face of the clamp ring 5 when the clamp ring 5 is fitted inside the cover 14 because the diameter-extension piece 6 is disposed as to protrude the regulation portion 62 (for longer than the minute distance) from the end face of the clamp ring 5. Therefore, the diameter-extension piece 6 is certainly detached from the clamp ring 5.

Figure 29A:
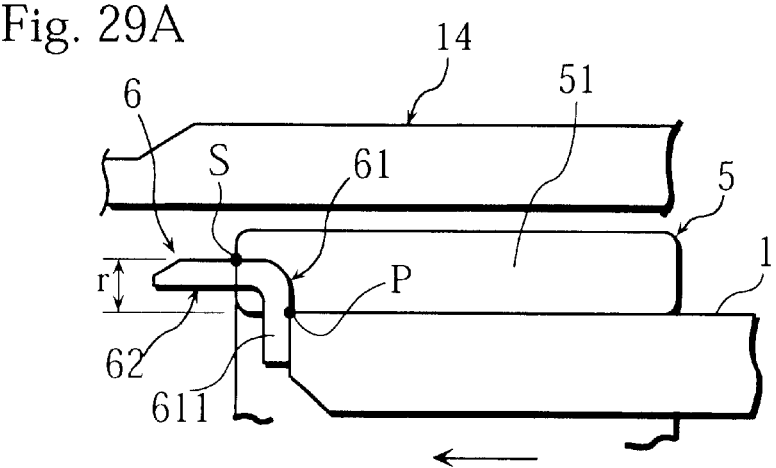
FIG. 29A is a working-explanatory view of the diameter-extension piece and the pipe.
Figure 29B:
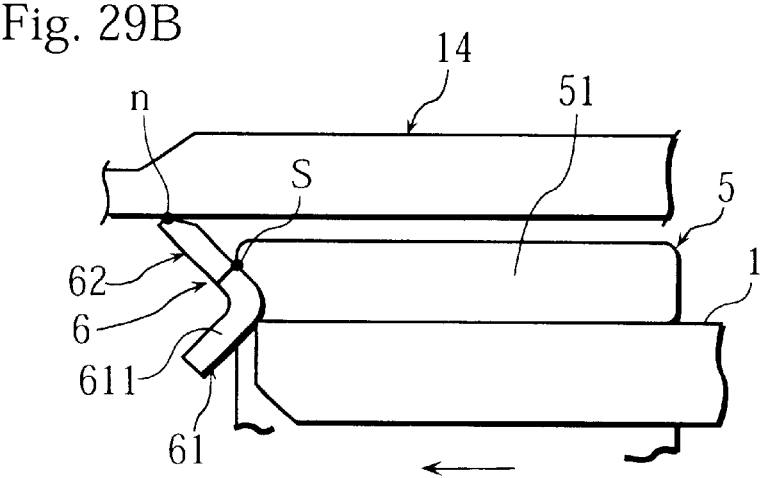
FIG. 29B is a working-explanatory view of the diameter-extension piece and the pipe.
Figure 29C:
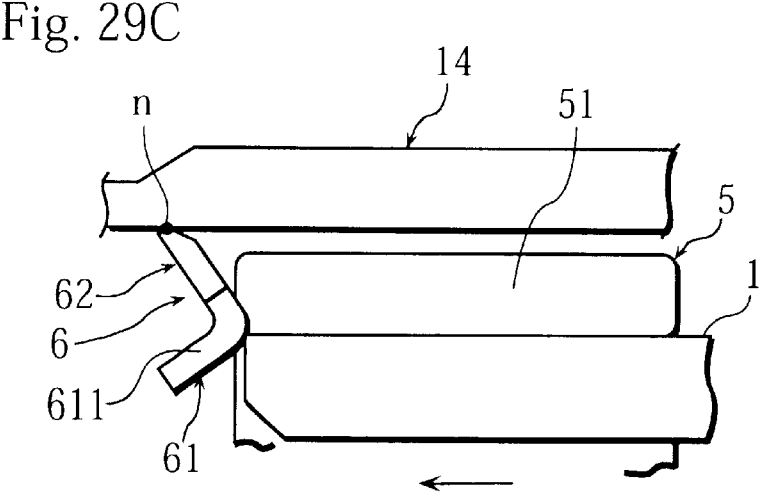
FIG. 29C is a working-explanatory view of the diameter-extension piece and the pipe.
Figure 30:
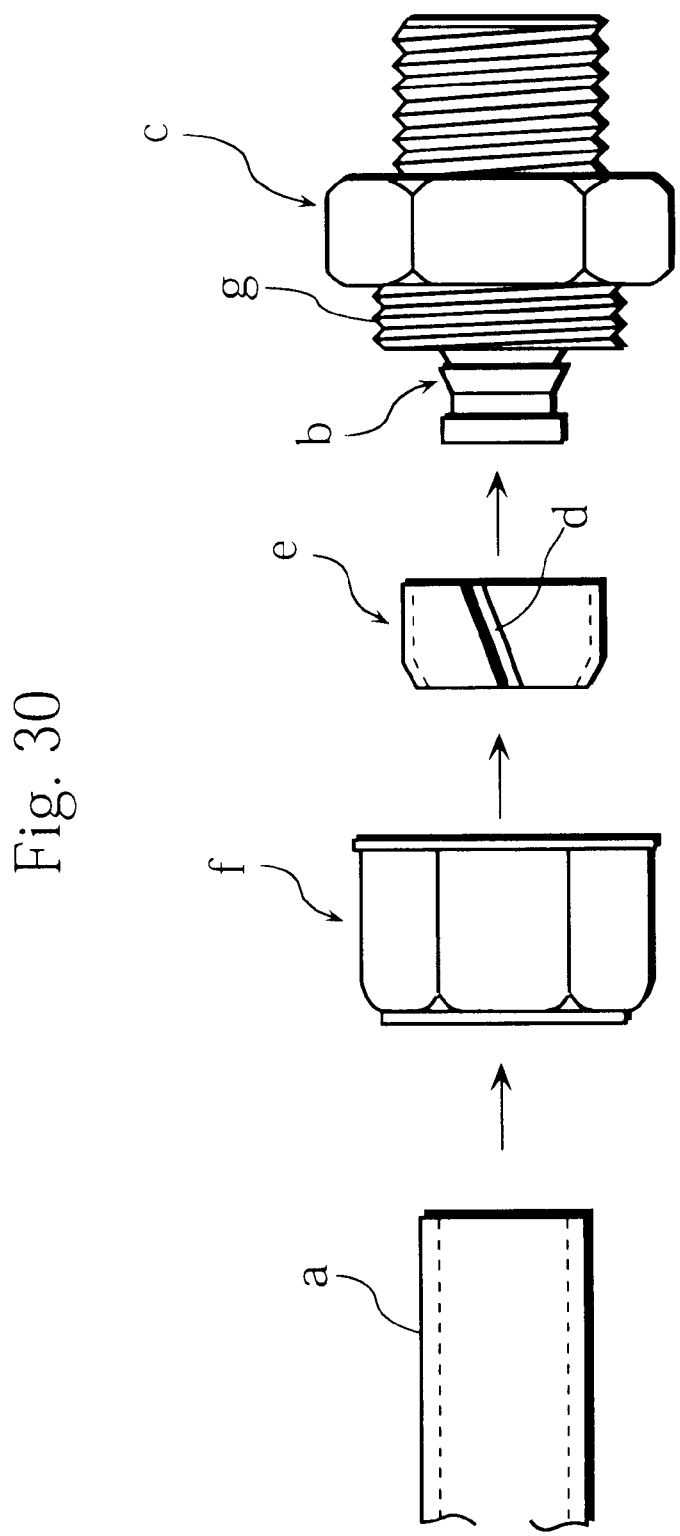
FIG. 30 is an explanatory exploded view of a conventional pipe joint.

And, as the pipe 1 is inserted in a direction of an arrow A, as shown in FIG. 29A, the forth end face of the pipe 1 pushes the press-fit portion 61 of the diameter-extension piece 6, and the press-fit portion 61 is detached from the slit 51 as the diameter-extension piece 6 turns (oscillates) around an outer end portion S of the regulation portion 62 as a center. Then, as shown in FIG. 29B, the forth end portion of the regulation portion 62 contacts the inner face of the cover 14 at a contact point n, and the diameter-extension piece 6 turns around the contact point n instead of the outer end portion S. And, the press-fit portion 61 is detached from the slit 51 as shown in FIG. 29C. Finally, the diameter-extension piece 6 is detached from the clamp ring 5 and the pipe 1 is fastened and connected.

As described above, the press-fit portion 61 does not stick to the forth end face of the pipe 1 even if the pipe 1 is made of soft resin because the forth end face of the pipe 1 pushes the flat press-fit portion 61. And, the diameter-extension piece 6 can keep a stable held position against forces of peripheral direction because the press-fit portion 61 is held by the inner end edges of the clamp ring 5 as shown in FIG. 27B. Therefore, the diameter-extension piece 6 is not detached from the clamp ring 5 even if the pipe 1 is inserted with crotation as to be screwed. Further, as shown in FIG. 29B, angular moment of the diameter-extension piece 6 can be increased by transfering the center (supporting point) of turning of the diameter-extension piece 6 from the outer end portion S to the contact point n, and the diameter-extension piece 6 can be certainly detached by small force.

Figure 25:
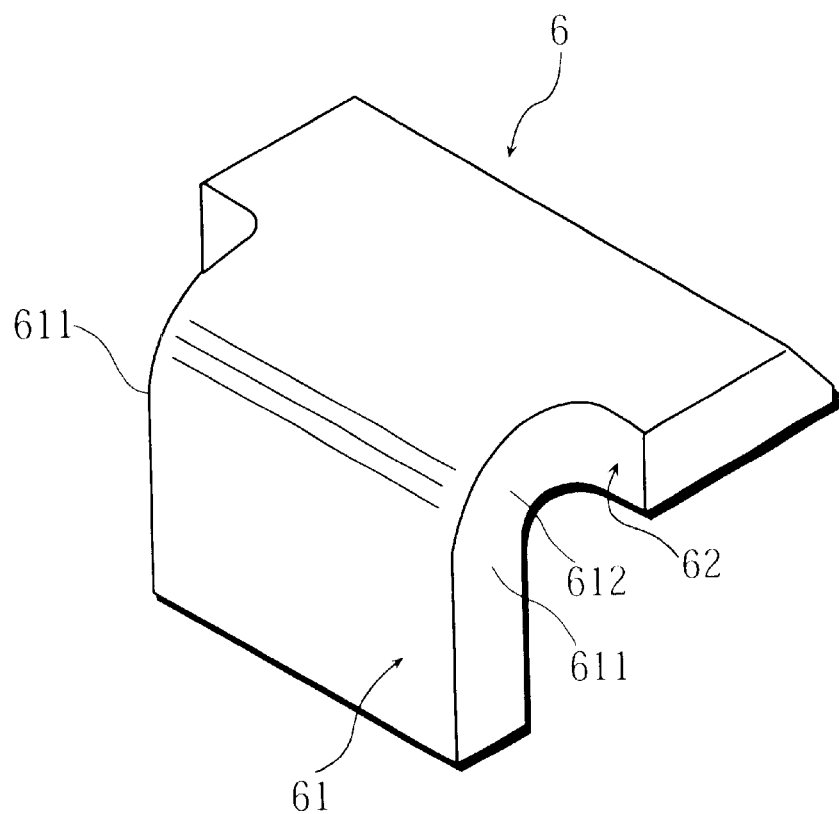
FIG. 25 is a perspective view showing still another example of the diameter-extension piece.
Figure 26A:
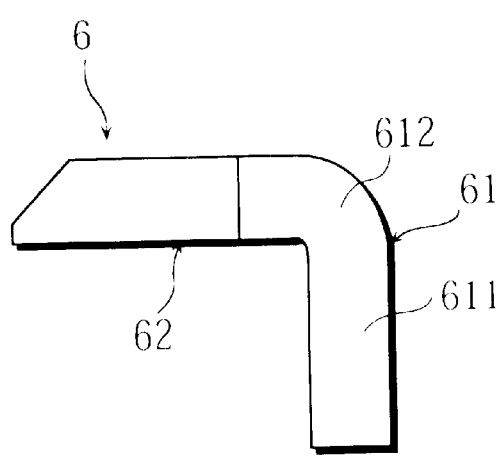
FIG. 26A is a side view showing still another example of the diameter-extension piece.
Figure 26B:
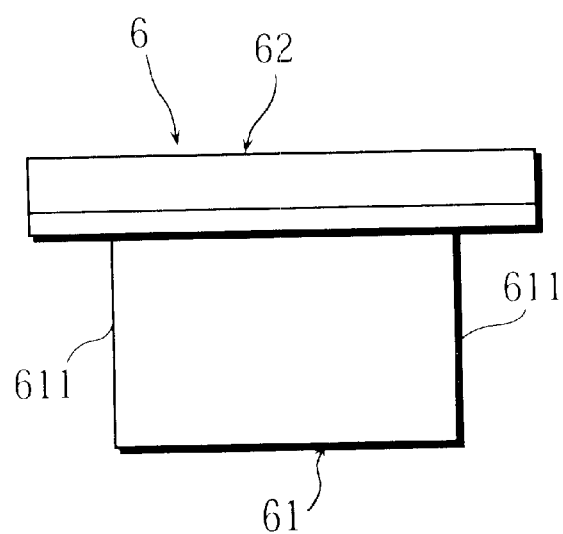
FIG. 26B is a rear view showing still another example of the diameter-extension piece.

And, in the present invention, not restricted to the embodiments described above, for example, the diameter-extension piece 6 shown in FIG. 25 may be used for the pipe joint without the cover as shown in FIG. 1. And, design of the pipe joint may be modified within the scope of the invention.

According to the pipe joint of the present invention, by only one pushing movement of the pipe 1, the diameter-extension piece 6 is detached from the slit 51 of the clamp ring 5, the clamp ring 5 contracts and fastens the end portion of the pipe 1, the inner face of the pipe 1 fits to the sealing member 4 to tightly seal the joint, and the connecting work is completed.

In the connected state, excellent leakage prevention is always kept and durable and stable sealing ability is secured even with variation of diameter of the pipe 1 and dimensional change caused by thermal deformation because the inner face of the pipe 1 is kept tightly sealed by the sealing member 4.

The connecting work, comprising only pushing the pipe 1 to the joint main body 2, can be completed very efficiently with one movement and without connecting tools, fastening parts, and high skill, and workability at working sites is remarkably improved. And, control of the parts is easy, preparation of the parts at the working sites is easy and certain, and missing of the parts hardly occurs because the parts of the pipe joint are unitedly assembled beforehand.

And, the diameter-extension piece 6 detached from the slit 51 of the clamp ring 5 by the pushing movement of the pipe 1 can be stored in the escape space 16 immediately.

And, when the diameter-extension piece 6 is press-fitted to the slit 51, the position of the press fitting can be easily and certainly regulated by the regulation portion 62 and the press-fitted state becomes stable.

And, when the pipe 1 is pushed in, the diameter-extension piece 6 is easily turned and certainly detached from the slit 51 by the contact of the pipe 1 with the protruding contact portion 63 of the diameter-extension piece 6.

And, the diameter-extension piece 6 is (unitedly) easily made to reduce the production cost and time.

And, when the diameter-extension piece 6 is detached by the pushing movement of the pipe 1, the press-fit portion 61 is pushed by the forth end portion of the pipe 1, the regulation portion 62 is oscillated (outward in the diameter direction) to contact a predetermined portion of the pipe joint, and the diameter-extension piece 6 can be detached with smaller force thereby.

And, the diameter-extension piece 6 can keep a stable held position against forces of peripheral direction because the press-fit portion 61 is held by the inner end edges of the clamp ring 5. Therefore, the diameter-extension piece 6 is not detached from the clamp ring 5 even if the pipe 1 is inserted with rotation as to be screwed.

And, when the diameter-extension piece 6 is detached by the pushing movement of the pipe 1, the detachment of the diameter-extension piece 6 is made easy by the large angular moment added to the diameter-extension piece 6 with small pushing force of the pipe 1 by the appropriate interval r set between the end portion S on the peripheral side as the center of the turn and the portion (contact portion) P which contacts the forth end portion of the pipe 1.

And, when the pipe 1 is fastened by the clamp ring 5, the surface of the pipe 1 is prevented from flaws, fastening work of the clamp ring 5 becomes smooth, and strong fastening force works on the pipe 1.

And, the fastening force works on the pipe 1 in the peripheral direction without interruption because the slit 51 is formed as to be concavo-convex, and the sealability is improved thereby.

And, the completion of the pushing movement of the pipe 1 can be clearly checked by checking the detachment sound from the outside when the diameter-extension piece 6 is detached from the slit 51, and workability is improved thereby.

Further, according to the pipe joint of the present invention, durability of the pipe joint is improved and the sealability of the pipe joint is kept stable further in a long term because the connected part of the pipe 1 is protected by the cover 14 which covers the clamp ring 5.

And, the detachment of the diameter-extension piece 6 can be easily (visually) recognized for the cover 14 composed of transparent resin and the pipe 1 is certainly connected.

While preferred embodiments of the present invention have been described in this specification, it is to be understood that the invention is illustrative and not restrictive, because various changes are possible within the spirit and indispensable features.

What is claimed is:

1. A pipe joint comprising a joint main body having an insertion cylinder portion inserted to an end portion of a pipe to be connected, a sealing member attached to a peripheral concave groove on the insertion cylinder portion, a clamp ring with a slit for fastening the end portion of the pipe to the insertion cylinder portion with an elastic fastening force, and a diameter-extension piece detachably held by end faces of the slit as to extend the clamp ring resisting the elastic force of the clamp ring and detached by a forth end portion of the pipe which contacts the diameter-extension piece.

2. The pipe joint as set forth in claim 1, wherein the diameter-extension piece is composed of a press-fit portion held by the slit and a regulation portion which contacts a side end face of the clamp ring to regulate press-fit position of the diameter-extension piece unitedly formed.

3. The pipe joint as set forth in claim 2, wherein a protruding contact portion which contacts the forth end portion of the pipe is formed on the press-fit portion of the diameter-extension piece.

4. The pipe joint as set forth in claim 2, wherein the press-fit portion is held by inner end edges of the clamp ring, an end side of the diameter-extension piece is protruded inward in a diameter direction of the clamp ring, and the regulation portion is protruded outward in an axis direction of the clamp ring in a state that the diameter-extension piece is press-fitted to the clamp ring.

5. The pipe joint as set forth in claim 1, wherein a predetermined interval for facilitating the detachment of the diameter-extension piece is set between an end portion on the peripheral side of a regulation portion and a portion which contacts the forth end portion of the pipe in a state that the diameter-extension piece is press-fitted to the clamp ring.

6. The pipe joint as set forth in claim 1, wherein inner end edges of both end faces facing on the both sides of the slit are formed in R-shaped chamfers.

7. The pipe joint as set forth in claim 6, wherein a protruding portion formed on one of the end faces engages with a concave portion formed on the other of the end faces.

8. The pipe joint as set forth in claim 1, wherein a detachment sound which can be recognized from the outside of the pipe joint is generated when the diameter-extension piece is detached from the slit by the inserted pipe.

* * * * *